US007446872B2

(12) United States Patent
Lin et al.

(10) Patent No.: US 7,446,872 B2

(45) Date of Patent: Nov. 4, 2008

(54) POSITIONING APPARATUS AND POSITIONING METHOD USING THE SAME

(75) Inventors: Po-Ching Lin, Hsinchu (TW); Yu-Cheng Yang, Hsinchu (TW)

(73) Assignee: Powerchip Semiconductor Corp., Hsinchu (TW)

( * ) Notice: Subject to any disclaimer, the term of this patent is extended or adjusted under 35 U.S.C. 154(b) by 898 days.

(21) Appl. No.: 10/710,270

(22) Filed: Jun. 30, 2004

(65) Prior Publication Data

US 2005/0208842 A1 Sep. 22, 2005

(30) Foreign Application Priority Data

Mar. 16, 2004 (TW) .............................. 93106927 A

(51) Int. Cl.
*B65G 1/13* (2006.01)
*G01B 11/00* (2006.01)

(52) U.S. Cl. ..................... 356/399; 414/217; 250/559.3

(58) Field of Classification Search .......... 356/399–401
See application file for complete search history.

(56) References Cited

U.S. PATENT DOCUMENTS 3,584,960 A * 6/1971 Seailles ...................... 356/401
4,286,201 A * 8/1981 Roecks et al. ............... 318/640
5,340,261 A * 8/1994 Oosawa et al. .............. 414/217
5,876,884 A * 3/1999 Maeda et al. ................. 430/22
6,307,211 B1 * 10/2001 Beckhart et al. ....... 250/559.33
6,541,787 B2 * 4/2003 Lin et al. ................. 250/559.3
7,099,009 B2 * 8/2006 DeGeorge et al. ........... 356/400
2002/0197136 A1 * 12/2002 Huang et al. ................ 414/217

* cited by examiner

*Primary Examiner*—L. G. Lauchman
*Assistant Examiner*—Rebecca C Slomski
(74) *Attorney, Agent, or Firm*—Jianq Chyun IP Office

(57) ABSTRACT

An apparatus for positioning a transport system and a load port is described, including a signal emitting unit disposed on the transport system and a positioning board on the load port. The signal emitting unit has two positioning points thereon capable of emitting two light beams to the positioning board, while the positioning board has two holes thereon at two positions corresponding to the two positioning points. The two light beams can pass through the two holes perpendicular to the positioning board in a horizontal state when the load port is aligned with the transport system.

5 Claims, 2 Drawing Sheets

POSITIONING APPARATUS AND POSITIONING METHOD USING THE SAME

CROSS REFERENCE TO RELATED APPLICATIONS

This application claims the priority benefit of Taiwan application serial no. 93106927, filed Mar. 16, 2004.

BACKGROUND OF INVENTION

1. Field of the Invention

This invention generally relates to a positioning apparatus used in a factory and a positioning method using the same, and more particularly to a positioning apparatus and a positioning method using the same for directly positioning a load port of a machine and an overhead hoist transport (OHT) system.

2. Description of Related Art

In a factory of high-technology industry like a semiconductor manufacturing fab, most semi-products are moved via an OHT system to reduce the cost and the possibility of damage due to negligence. The OHT system is generally set above all manufacturing machines, capable of picking one or more semi-products up form a machine after the process in that machine is complete and carrying them to another machine for the next process. Taking the OHT system in an ordinary semiconductor manufacturing fab as an example, it can pick up a front opening unified pod (FOUP) carrying multiple wafers from a machine, move the FOUP to above the load port of another machine, and move the FOUP down to the load port.

Hence, to make the manufacturing process smooth, alignment between the OHT system and all machines is a very important issue. When there is a new machine added in the fab, in order to precisely align the load port of the new machine with the OHT system, one should first align the OHT system with a positioning point in the fab and then align the load port of the new machine with the positioning point. However, such an indirect positioning method will increase not only the positioning error but also the positioning difficulty probably due to a long distance between the positioning point and the machine and/or the hindrances between them.

SUMMARY OF INVENTION

In view of the foregoing, an object of the present invention is to provide a positioning apparatus capable of directly positioning an OHT system and the load port of a machine, thereby increasing the positioning precision.

Another object of the present invention is to provide a positioning method that uses the positioning apparatus of the present invention to directly position the OHT system and the load port of a machine.

The positioning apparatus for positioning a transport system and a load port of the present invention includes a signal emitting unit disposed on one of the transport system and the load port and a positioning board on the other. The signal emitting unit has two positioning points that emit two light beams to the positioning board. The positioning board has two holes at two positions corresponding to the two positioning points, which means that the two holes are aligned vertically with the two positioning points when the load port is aligned with the transport system and the positioning board is horizontal. Accordingly, when the two light beams can pass through the two holes perpendicular to the positioning board in a horizontal state, the load port is aligned with the transport system.

In a preferred embodiment of the present invention, the positioning board further includes at least one beam monitoring device for monitoring collimation of at least one of the two light beams passing through the two holes. The beam monitoring device includes a light projection board and a reflecting mirror, while the light beam is reflected to the light projection board via the reflecting mirror.

The positioning method of the present invention using the above-mentioned positioning apparatus is described as follows. At first, the positioning board is disposed on the load port, and the signal emitting unit on the transport system. The positioning board is set to be horizontal, and the signal emitting unit is made emit two light beams to the positioning board, wherein the two light beams are set to be perpendicular to the surface of the latter. If the load port is not aligned with the transport system, the two light beams cannot pass through the two holes on the positioning board and will generate two light spots on the positioning board. A translational deviation and a rotational deviation of the load port in XY plane are obtained based on the positions of the two light spots relative to the two holes. The load port is then adjusted based on the translational deviation and the rotational deviation until the two light beams can pass through the two holes on the positioning board.

Because the above positioning method uses the positioning apparatus of the present invention to directly position the OHT system and the load port of a machine, it is easier than the conventional indirect positioning method and therefore can increase the positioning precision.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
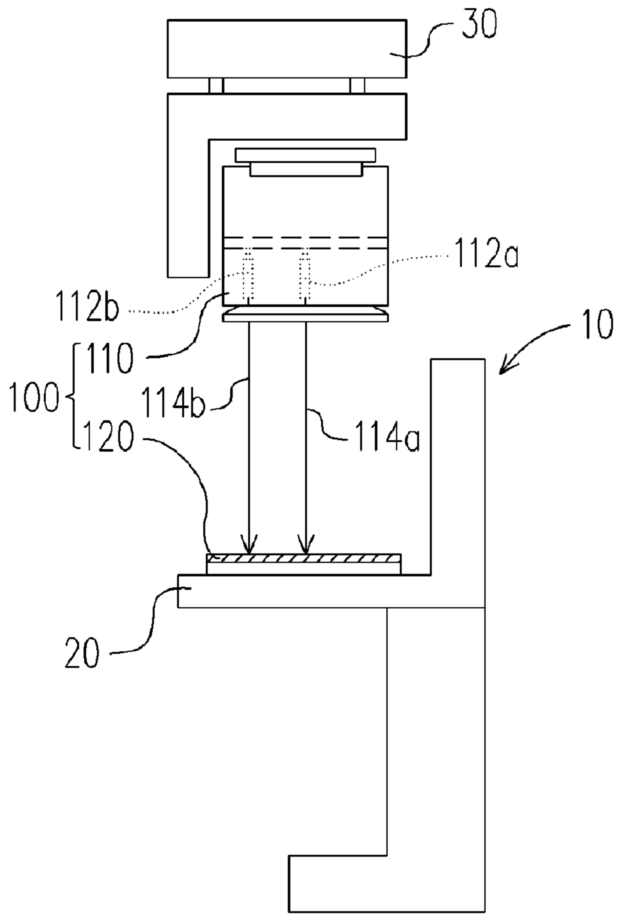
FIG. 1 shows the positioning apparatus and the use thereof in accordance with a preferred embodiment of the present invention.

FIG. 1 shows the positioning apparatus and the use thereof in accordance with the preferred embodiment of the present invention. Referring to FIG. 1, the positioning apparatus 100 includes a positioning FOUP 110 and a positioning board 120, which are disposed on an OHT system 30 and a load port 20 of a machine 10, respectively. The positioning FOUP 110 is used as a signal emitting unit mentioned above, having two laser emitters 112*a* and 112*b* at the bottom thereof that can emit two laser beams 114*a* and 114*b* toward the positioning board 120 below the FOUP 110. Ideally, the two laser beams 114*a* and 114*b* are perpendicular to the surface of the positioning board 120.

Figure 2:
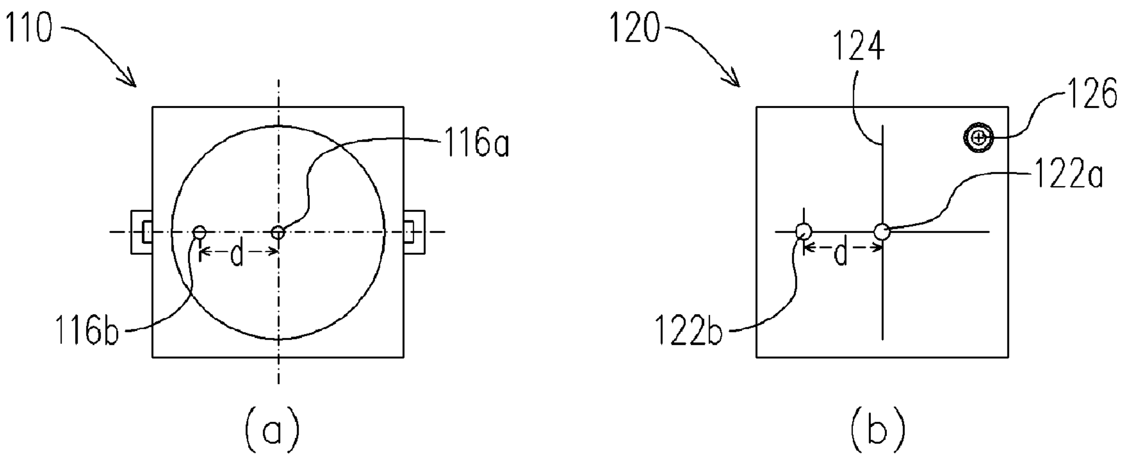
FIG. 2 shows (a) the bottom view of a positioning FOUP as the signal emitting unit, and (b) the top view of the positioning board.

FIG. 2 shows (a) the bottom view of the positioning FOUP 110 as the signal emitting unit, and (b) the top view of the positioning board. Referring to FIG. 2(*a*), there are two positioning points at the bottom of the FOUP 110 formed to be two laser beam exits 116*a* and 116*b*, through which the laser beams 114*a* and 114*b* can pass. Referring to FIG. 2(*b*), the positioning board 120 has two holes 122*a* and 122*b* at two positions corresponding to the above two positioning points 116*a* and 116*b*, which means that the two holes 122*a* and 122*b* are right below the two positioning points 116*a* and 116*b* when the OHT system 30 and the load port 20 are aligned with each other and the positioning board 120 is horizontal. Hence, the distance "d" between the laser beam exits 116*a* and 116*b* is equal to the distance between the holes 122*a* and 122*b*. The positioning board 120 also has coordination axes 124 thereon passing the two holes 122*a* and 122*b*, and may further include a leveler 126 for adjusting the horizontal level of the positioning board 120.

Figure 3:
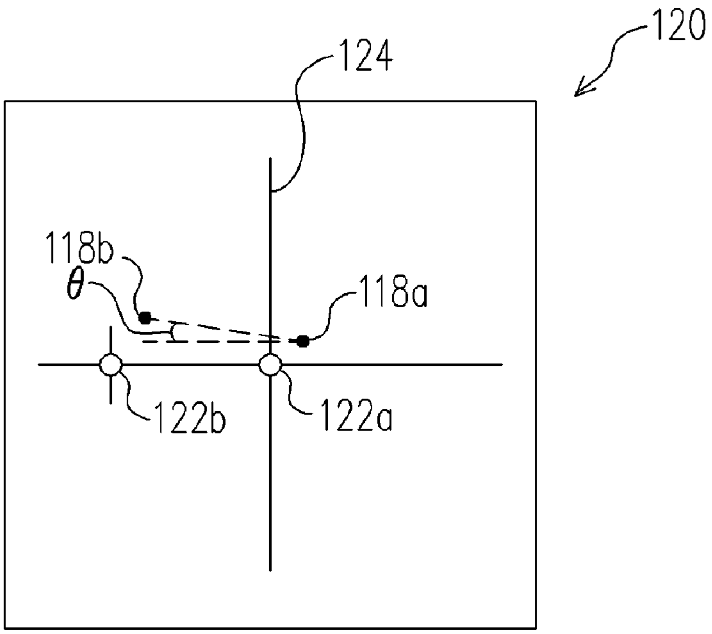
FIG. 3 shows the use of the positioning board in accordance with the preferred embodiment of the present invention.

FIG. 3 shows the use of the positioning board 120 in accordance with the preferred embodiment of the present invention. When the OHT system 30 and the load port 20 (FIG. 1) are not aligned with each other, i.e., when the two holes 122*a* and 122*b* on the positioning board 120 are not aligned with the two positioning points (laser beam exits) 116*a* and 116*b* on the FOUP 110, the laser beams 114*a* and 114*b* (FIG. 1) cannot pass through the two holes 122*a* and 122*b* and will generate two light spots 118*a* and 118*b* on the positioning board 120. The translational deviation and the rotation deviation θ of the positioning board 120 in XY plane are then obtained based on the positions of the light spots 118*a* and 118*b* relative to the two holes 122*a* and 122*b*. The load port 20 is adjusted according to the translational deviation and the rotational deviation until the laser beams 114*a/b* can pass through the holes 122*a/b* on the positioning board 120 without generating light spots.

Figure 4:
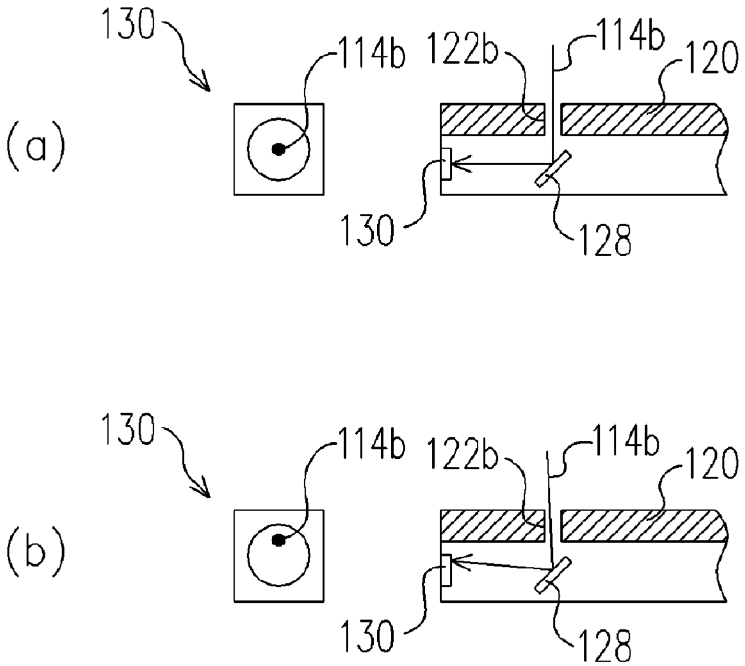
FIG. 4 shows the use of a beam monitoring device in the positioning board for monitoring collimation of a light beam in accordance with the preferred embodiment of the present invention, wherein (a) shows the result when the incident light beam is perpendicular to the positioning board and (b) shows the result when the incident light beam is not perpendicular to the positioning board.

In addition, as described above, when the laser beams 114*a* and 114*a* can pass through the holes 122*a* and 122*b* perpendicular to the surface of the positioning board 120 in a horizontal state, the load port 20 is aligned with the OHT system 30. Hence, if one cannot assure that the laser beams 114*a* and 114*b* are perpendicular to the positioning board 120, at least one beam monitoring device can be added in the positioning board 120 to monitor collimation of at least one of the two laser beams 114*a* and 114*b* passing through the two holes 122*a* and 122*b*. The beam monitoring device as shown in FIG. 4 includes a light projection board 130 and a reflecting mirror 128, and the laser beam (e.g., 114*b*) is reflected to the light projection board 130 via the reflecting mirror 128. The angle between the reflecting mirror and the positioning board 120 is, for example, 45 degrees, so that the direction of the laser beam 114*b* originally perpendicular to the surface of the positioning board 120 is changed to be parallel to the same. In addition, the light projection board 130 has a circle pattern thereon for indicating the position of the light spot projected on the light projection board 130.

As shown in FIG. 4(*a*), in this embodiment, when the laser beam 114*b* passes through the hole 122*b* perpendicular to the positioning board 120, it can be projected at the center of the light projection board 130. On the contrary, as shown in FIG. 4(*b*), when the laser beam 114*b* is not perpendicular to the positioning board 120, the projection position of the laser beam 114*b* on the light projection board 130 deviates from the center of the light projection board 130. At this point, one can fine tune the directions of the laser beams 114*a* and 114*b* according to the monitor result, and then calculate a new translational deviation and a new rotational deviation by using the positioning board 120. The load port 20 is adjusted again according to the calculation result until the two laser beams 114*a* and 114*b* can pass through the two holes 122*a* and 122*b*, and the above collimation monitoring step is conducted again to check whether the two laser beams 114*a* and 114*b* are perpendicular to the positioning board 120. If the two laser beams 114*a* and 114*b* can pass through the two holes 122*a* and 122*b* perpendicular to the positioning board 120, the load port 20 is aligned with the transport system 30. Otherwise, the steps of adjusting the directions of the laser beams 114*a* and 114*b*, calculating the translational deviation and the rotational deviation and adjusting the positioning board 120 accordingly are repeated for at least one cycle, until the two laser beams 114*a* and 114*b* can pass through the two holes 122*a* and 122*b* perpendicular to the positioning board 120.

In addition, although using the light projection board 130 to monitor collimation of a laser beam is easier, the present invention can alternatively use a light sensor to determine whether the laser beam is projected onto a correct position.

Furthermore, although it is the load port that is adjusted to align with the OHT system in the above embodiment, the OHT system may alternatively be adjusted to align with the load port under some circumstances according to the principle of the present invention. In addition, although in the above embodiment the signal emitting unit and the positioning board are disposed on the OHT system and the load port, respectively, the locations of the signal emitting unit and the positioning board can be switched. That is, the signal emitting unit and the positioning board can alternatively be disposed on the load port and the OHT system, respectively, while the laser beams are emitted upward perpendicularly in such a case.

Moreover, though the aforementioned positioning apparatus is applied to a vertical alignment process, it can be modified to satisfy other situations. Generally speaking, when a positioning apparatus meets the following requirements, it falls within the scope of the present invention. Such a positioning apparatus includes a signal generating unit and a positioning unit, wherein the signal generating unit is disposed on one of two objects to be positioned and the positioning unit on the other. The signal generating unit has two positioning points thereon capable of emitting two light beams to the positioning unit, and the positioning unit has two holes at two specific positions. Each of the two light beams can pass through a corresponding hole in a specific direction when the two objects are aligned with each other.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. A positioning method for directly positioning a load port and a transport system, comprising:

(a) disposing a positioning board on the load port, the positioning board having two holes thereon;

(b) disposing a signal emitting unit on the transport system, wherein the signal emitting unit has two positioning points thereon capable of emitting two light beams to the positioning board, and positions of the two positioning points correspond to positions of the two holes;

(c) setting the positioning board to be horizontal;

(d) making the signal emitting unit emit two light beams to the positioning board, wherein the two light beams are set to be perpendicular to a surface of the positioning board;

(e) obtaining a translational deviation and a rotational deviation of the load port based on positions of two light spots on the positioning board generated from the two light beams relative to the two holes; and (f) adjusting the load port according to the translational deviation and the rotational deviation, until the two light beams can pass through the two holes.

2. The method of claim 1, wherein the step of setting the positioning board to be horizontal includes using a leveler to adjust the load port.

3. The method of claim 1, wherein the positioning board further includes at least one beam monitoring device, the method further comprising:

(g) using the at least one beam monitoring device to monitor collimation of at least one of the two light beams passing through the two holes and adjusting a direction of the light beam according to the monitor result; and repeating the steps (e) and (f) and then observing whether the two light beams pass through the two holes perpendicular to the positioning board or not; if the two light beams pass through the two holes perpendicular to the positioning board, the load port is aligned with the transport system; otherwise, repeating the steps (g), (e) and (f) until the two light beams can pass through the two holes perpendicular to the positioning board.

4. The method of claim 3, wherein the beam monitoring device includes a light projection board and a reflecting mirror, wherein the light beam is reflected to the light projection board via the reflecting mirror.

5. The method of claim 4, wherein the step of monitoring collimation of the light beam is based on variation of a position where the light beam is projected on the light projection board.

* * * * *